(12) United States Patent
Mahavadi et al.

(10) Patent No.: US 11,169,114 B2
(45) Date of Patent: Nov. 9, 2021

(54) SIMULTANEOUS ANALYSIS OF MULTIPLE COMPONENTS IN WELL FLUIDS

(71) Applicant: Schlumberger Technology Corporation, Sugar Land, TX (US)

(72) Inventors: Sharath Chandra Mahavadi, Edmonton (CA); Simon Ivar Andersen, Copenhagen (DE); Olivier Porcherie, Clamart (FR); Isabelle Couillet, Clamart (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 15/304,643

(22) PCT Filed: Jan. 20, 2015

(86) PCT No.: PCT/US2015/011934
§ 371 (c)(1),
(2) Date: Oct. 17, 2016

(87) PCT Pub. No.: WO2015/167627
PCT Pub. Date: Nov. 5, 2015

(65) Prior Publication Data
US 2017/0045476 A1 Feb. 16, 2017

Related U.S. Application Data

(60) Provisional application No. 61/986,275, filed on Apr. 30, 2014.

(51) Int. Cl.
*G01N 27/447* (2006.01)
*E21B 41/00* (2006.01)
(Continued)

(52) U.S. Cl.
CPC ....... *G01N 27/44791* (2013.01); *E21B 41/00* (2013.01); *G01N 27/44743* (2013.01);
(Continued)

(58) Field of Classification Search
CPC .......... G01N 27/447; G01N 27/44756; G01N 27/44791; E21B 49/00; E21B 49/08
See application file for complete search history.

(56) References Cited

U.S. PATENT DOCUMENTS 4,003,431 A 1/1977 Novotny et al.
5,027,267 A 6/1991 Pitts et al.
(Continued)

FOREIGN PATENT DOCUMENTS

WO 9521378 A1 8/1995
WO 2011064632 A2 6/2011
(Continued)

OTHER PUBLICATIONS

Timerbaev et al., "Inorganic environmental analysis by capillary electrophoresis," Analyst, 1999, 124, 811-826 (Year: 1999).*
(Continued)

*Primary Examiner* — Alexander S Noguerola

(57) ABSTRACT

The current application discloses methods and systems to analyze on-site and in real-time or quasi real-time the composition of the well fluid before or during use or disposition. The method is based on capillary electrophoresis (CE) and does not require the addition of tracers into the well fluid or additive. Based on the significance of each additive on the well fluid properties, it can be decided to determine the concentration of all additives or only one or a limited number of the additives present in the fluid, and the concentrations can be adjusted as needed to reach the desired target concentration(s).

20 Claims, 3 Drawing Sheets

(51) Int. Cl.
*E21B 49/00* (2006.01)
*E21B 33/14* (2006.01)

(52) U.S. Cl.
CPC ........ *G01N 27/44756* (2013.01); *E21B 33/14* (2013.01); *E21B 49/00* (2013.01)

(56) References Cited

U.S. PATENT DOCUMENTS

| | | | |
|---|---|---|---|
| 5,289,877 | A | 3/1994 | Naegele et al. |
| 5,445,228 | A * | 8/1995 | Rathmell .............. E21B 43/119 |
| | | | 175/4 |
| 6,090,250 | A | 7/2000 | Mazzeo et al. |
| 6,816,791 | B2 | 11/2004 | Myers et al. |
| 7,284,898 | B2 | 10/2007 | Duell et al. |
| 7,308,379 | B2 | 12/2007 | Dykstra et al. |
| 7,387,159 | B2 | 6/2008 | Fitzgerald |
| 7,620,481 | B2 | 11/2009 | Dykstra |
| 7,660,648 | B2 | 2/2010 | Dykstra |
| 8,619,256 | B1 | 12/2013 | Pelletier et al. |
| 9,228,940 | B2 | 1/2016 | Pelletier et al. |
| 2004/0045350 | A1 * | 3/2004 | Jones .................... E21B 43/38 |
| | | | 73/152.23 |
| 2011/0084202 | A1 * | 4/2011 | Finlay ................. G01N 33/2823 |
| | | | 250/254 |
| 2011/0127034 | A1 * | 6/2011 | Vidick ................. C04B 40/0032 |
| | | | 166/293 |
| 2012/0125604 | A1 * | 5/2012 | Willingham ............ C09K 8/58 |
| | | | 166/270.1 |
| 2014/0296113 | A1 * | 10/2014 | Reyes .................... C09K 8/528 |
| | | | 507/241 |
| 2015/0168581 | A1 | 6/2015 | Izuhara et al. |

FOREIGN PATENT DOCUMENTS

| | | |
|---|---|---|
| WO | 2014014587 A2 | 1/2014 |
| WO | 2015167627 A1 | 11/2015 |

OTHER PUBLICATIONS

Xiang et al., "Mechanisms of microbial enhanced oil recovery," Shiyou Kantan Yu Kaifa / Shiyou Kantan Yu Kaifa vol. 25, issue 4, pp. 53-55, 1998 (Year: 1998).*

PetroWiki article entitled "Cement slurry retarders" downloaded Mar. 8, 2021 from htttps://petrowiki.spe.org/Cement_slurry_retarders, last edited on Jun. 25, 2015 (Year: 2015).*

Full English language translation of Xiang et al., "Mechanisms of microbial enhanced oil recovery," Shiyou Kantan Yu Kaifa / Shiyou Kantan Yu Kaifa vol. 25, issue 4, pp. 53-55, 1998 (Year: 1998) (Year: 1998).*

Cob, A; Improved Analysis Techniques Quantitatively Determine Critical Organic Additives Simultaneously in Cement Blends, SPE 86-37-48, 1986 95-100.

International Search Report and the Written Opinion issued in the related PCT Application PCT/US2015/011934, dated May 20, 2015 (9 pages).

Laurent Geiser, Jean-Luc Veuthey; Non-Aqueous Capillary Electrophoresis 2005-2008, Electrophoresis, 2009 vol. 30 pp. 36-49.

* cited by examiner

SIMULTANEOUS ANALYSIS OF MULTIPLE COMPONENTS IN WELL FLUIDS

CROSS-REFERENCE TO RELATED APPLICATIONS

This application claims priority to U.S. Ser. No. 61/986,275, filed on Apr. 30, 2014, and expressly incorporated by reference herein in its entirety for all purposes.

FIELD OF THE DISCLOSURE

Detection and quantitation of various oilfield and other reservoir fluids and fluid additives using capillary electrophoresis, systems, devices, and methods therefore. The methods are suitable for use at the well site or in the field.

BACKGROUND

Cementing is one of the most critical steps in oil and gas well completion. It is therefore important that all specifications required to comply with material performance as well as regulations are followed and monitored correctly.

Cement fills and seals the annulus between the casing string and the drilled hole. It has three general purposes: (1) zone isolation, (2) corrosion control, and (3) formation stability and pipe strength improvement. Cement forms a strong, nearly impermeable seal from a thin slurry. The properties of the cement slurry and its behavior depend on the main components and the additives present in the cement slurry.

The cement used to complete an oil and gas well is thus specifically designed for each reservoir to accommodate the local geological structure, minerals, hardness, permeability and porosity, water sensitive formations, downhole temperatures, and the like. The cement slurry should be:

Stable, i.e. limited or no density gradient along the cement sheath and limited or no free fluid above the cement sheath.
Provide adequate fluid-loss control.
Controllable thickening and setting times. The slurry should remain fluid during placement, and set rapidly once placed at the right zone.
Maintain a stable density to ensure hydrostatic control.

Cement slurry is typically made by mixing cement powder, water and various additives that may include retarders, dispersants, fluid-loss additives, anti-foam additives, and the like. Herein, we use the term "mix-fluid" to refer to the water plus the additives, without the added cement and other solids, if any.

There are two types of oilfield cement mixing equipment: batch and on-the-fly. Batch mixing is done in a large tank with circulation or paddle mixers. The cement and the mix-fluid are measured into the tank with small additions of cement or mix-fluid to adjust concentrations to get the right slurry density and specifications. Although batch mixing is by far the most accurate method, the size of the job is limited by the volume of the tank at hand, and thus mixing on-the-fly is often used instead.

Mixing on-the-fly involves moving steady streams of cement and mix-water through a zone of turbulence produced by high velocity flow. The cement slurry produced in this manner is highly dependent on the experience and attention of the mixer operator. Numerous problems with variances in slurry weight have led to averaging "pods" or tanks downstream of the on-the-fly mixer. To minimize the damage produced from lighter or heavier than designed slurries, most cementing service companies have density monitoring devices to report slurry density back to the mixer operator.

When the cement slurry is going to be used to fill the space between a drilled bore hole and a casing inserted into that borehole, the slurry must flow for a considerable distance before it reaches its final position where it is then required to set. It is therefore normal to include a "retarder" to delay cement setting. Typically the retarder and other additives are supplied to the rig-site as manufactured products, which may be stock solutions or powders, and these are added to the mix-water before adding the cement powder.

It is important that the correct amount of retarder, accelerator or any other additive is added. As an example, using too much retarder will delay set of the cement unnecessarily and hence increase the "waiting on cement" delay during which the well site stands idle because further work cannot be done until the cement has set. On the other hand, premature setting of the cement can be hugely expensive to rectify. Further, in some cases (e.g., cold environments such as Canada, or deepwater), accelerators are required. Other additives can also affect the thickening and setting times (e.g., dispersants). All of these ingredients must be accurately added to the cement slurry.

Yet, there is currently no satisfactory method for checking that the concentration of retarder as diluted in the mix-water is correct. WO2011064632 teaches one such method, but requires the use of a tracer mixed with the additive, such that tracer levels can be detected as a proxy for additive levels. However, the tracer itself can impact the chemistry of the ingredients and further, one must still have added the correct amount of tracer to the additive, and this introduces another point of variability from batch-to-batch of additive.

The concentration of e.g. retarder in a cement slurry is only one example of a fluid additive that needs to be very accurately mixed for successful use. Other non-limiting examples are antisettling, dispersant or fluid-loss-control additives. Further, in the oilfield industry, many different fluids can be injected into wells or subterranean zones. For example, drilling a well requires the use of a mud; cementing or plugging a well can require pumping chemical wash, spacer and settable compositions (cement slurry, resins, geopolymers, etc.). Once a well is able to produce, completion fluids might be required. For example, production can be improved during acidizing or fracturing operations, sand control can also be achieved by injecting optimized fluid containing sand, and various flooding fluids can be used to drive hydrocarbon towards the production well. These are just a few examples of well fluids that can be pumped into subterranean wells.

For each of the well fluids that are injected into a well, fluid properties are optimized based on well configuration (temperature, pressure, deviation, etc.), operational constraints (pumping rate, etc.) and customer requirements. Such fluids can be optimized in a laboratory following API recommended practices or standards, and with all chemicals (including water) used for the job. At a laboratory scale, it is relatively straightforward to accurately prepare the mix-fluid by weighing each additive and accurately measuring added water.

However, in the field much larger amounts of water and additives are used to prepare the mix-fluid, as much as 5-10 orders of magnitude larger. Further, there is usually less time rig-side and much less accurate equipment. Studies also show that it is difficult to analyze compositions by laboratory methods, such as high pressure liquid chromatography (HPLC), Inductively Coupled Plasma (ICP), Infrared or Raman techniques (especially in water-based mix-fluids), or differential scanning calorimetry (DSC). In addition, some of the conventional analysis methods need tedious sample preparation, further contributing to time lost. Finally, because a number of chemistries may be present in a mix-fluid, it is often difficult to use one single method or instrument to analyze all of the constituents of a mix-fluid. The complexity of techniques needed for analysis further contributes to time and cost requirements.

As a consequence, the concentration of additives in the mix-fluid can vary sometimes significantly—from the ideal mix-fluid designed at a laboratory scale.

Further, QA/QC on the mix-fluid composition is also sometimes limited, and often can be performed only after the job execution by analyzing a sample of the mix-fluids prepared on the rig at a remote location and even if sufficient facilities are available on site or nearby, such tests can be time consuming, and time wasted on a rig is money lost. Automatic equipment such as Liquid Additive Systems (LAS) can help improving the QA/QC during the job execution, but errors are often not detected in time to rectify.

Although the additive composition can be analyzed in a laboratory with advanced analytical tools, there are several major issues with the current practice in the industry—a few of them are as follows:

(1) the complexity of the chemistries viz., aliphatic, aromatic, polymers, inorganic salts, etc. of different additives warrants the usage of multiple techniques to perform complete analysis of the final mixture;
(2) the composition of each additive mixture and its nature (viz., pH, corrosive or caustic constituents, etc.) changes significantly from field to field and for each job;
(3) the additives can interact with each other, leading to inaccurate determinations of concentrations and thus necessitating a pre-separation of each component before measurement of the individual components;
(4) the accuracy of the various analytical tools used on a mixture is different and when combining numbers measured using different methods could lead to quality issues;
(5) experts are sometimes needed to analyze and interpret the data obtained from advanced high end analytical tools; and
(6) most importantly, none of these analytical techniques can be deployed to field locations.

Hence, there is a need in the art for a simple method that can be used in the field to check and confirm the concentrations of various additives and chemicals being used in various well fluids, especially in time for correction of deviations from target concentrations. The ideal method would be applicable to a wide variety of additives, without the need for complex sample preparation or separation steps, and would allow the simultaneous determination of all additives with a single methodology. Further, the method would be fast, easy to perform and reliable.

SUMMARY

In one aspect, the current application discloses methods and systems to analyze on-site and in real-time or quasi real-time, the composition of the well fluid before or during use or disposition. The method is based on capillary electrophoresis (CE) and does not require the addition of tracers into the well fluid or additive. Based on the significance of each additive on the well fluid properties, it can be decided to determine the concentration of all additives or only one or a limited number of the additives present in the fluid, and the concentrations can be adjusted as needed to reach the desired target concentration(s).

CE is highly sensitive and both quick and easy to perform. A CE unit can be accommodated in a well-side laboratory, e.g., in a portable building or mobile unit. Furthermore, there are now portable units available that can be used anywhere at the rig-site, including adjacent mixers or on or near the well-pad.

The methods and systems of the current application can be used to QA/QC the composition of each batch of additives. This method possesses advantages such as accuracy, ease-of-use and cost-saving. Variation from batch-to-batch and evolution after storage and/or transportation can be identified by the method of the current application, therefore improving overall the QA/QC of the manufacturing and of operations.

The methods and systems of the current application can also be used to QA/QC the composition of mix-fluids and/or well fluids while being deployed whenever batch mixing or on-the-fly mixing is used. The mix fluid can thus be sampled at suitable intervals, e.g., every 10-15 minutes or less, hourly, every 4 or 6 hours, twice daily or daily (depending on production needs), and thus be used to confirm that ingredients are being fed to the jet or equivalent mixer are correct. As yet another alternative, the mix-fluid batches can be sampled and tested before use in Liquid Additives Systems.

This method is also applicable to determine the composition of water used to prepare the mix-fluid. Very often, produced water is used to make various additive fluids or mix-fluids as a means of water conservation. However, produced water must typically be purified, at least somewhat, before use, and it can be important to know, e.g., the amount of salt or organic solvents in the water before use, as this can affect the amount of additives needed. Likewise, other brines and waters can be tested before use or disposal.

The methods and systems of the current application use capillary electrophoresis for the analysis of one or more components in a mix-fluid or well fluid prepared for oilfield and other reservoir applications. In one embodiment, the method determines the concentration of one or more ingredient present in the fluids. It can provide real-time or quasi real-time QA/QC on the rig. It can also be used to adjust the concentration of each ingredient to fit the formulation designed in the laboratory or dictated by regulatory requirements.

During operations, fluids can be prepared in different ways. For low volume of fluids to be pumped, fluids can be prepared in batch mix. During this operation, solid additives can be dissolved and liquid additives can be diluted in the water. Amount of water and of each additive can be added with the accuracy available on the rig, to correspond to the concentration determined in the laboratory. This mix-fluid can then be used to prepare the fluid pumped in subterranean zones.

Mix-fluids can be prepared in different ways. One possibility is to prepare sufficient amount of mix-fluid in a separate pit tank, as for the batch mix slurry described previously. Concentration of each additive corresponds to the formulation designed in the laboratory by adding the exact amount of each additive in the corresponding amount of water. The final fluid (as for example cement slurry) is prepared continuously by mixing the amount of mix-fluid with the corresponding amount of solid blends.

Mix-fluid can also be prepared continuously during mixing using a Liquid Additive System. In one system, additives are added automatically or manually inside a first tank to obtain the desired concentration in the mix-fluid. Once the mix-fluid is prepared in a first tank, it can be used to prepare the fluid to be pumped in subterranean zones. While the first mix-fluid is used, a second mix-fluid is prepared using the same method in a separate tank. When the first tank is empty, slurry can be prepared by using the mix-fluid prepared in the second tank. The empty first tank can then be used to prepare a new mix-fluid. By alternating the mix-fluid preparation in two separate tanks, it is possible to pump large volumes of slurry continuously. Depending on the pumping rate and slurry density, emptying each tank can last less than two minutes. In other Liquid Additives Systems, the additives are injected automatically in a water stream, which is then used promptly to prepare the slurry (e.g., cement or fracturing fluids).

Other operations are also known as spiking operations. In such operation, additives are added in water to correct the properties of the final slurry. Indeed, additives can be added in the solid phase, the blend being prepared for an expected situation. However, the quality of the field blend can vary with the composition of pilot blends. Furthermore, once drilled, field parameters might have changed (such as bottomhole temperature). Addition of supplementary additive can correct the initial slurry to take into account either quality difference between pilot and field blends and/or to accommodate small variations of given parameters (such as bottomhole conditions).

In each of the above cases, the actual concentrations or additives, contaminants or other ingredients can be ascertained and adjusted as needed before that fluid is used or disposed of.

Similarly, in the case of mud, it is recycled, and concentrations of the additives are adjusted on a regular basis as required. With the methods and systems disclosed in the current application, one can improve the quality of the drilling fluids and also add the additives when required.

The methods and systems of the current application can be used in any one of the above-described mixing processes, or combinations thereof. In particular, the method and system disclosed in the current application can be used in a mix-on-the-fly process to substantially increase the QA/QC of the mix-on-the-fly process. The method can also be used to test the concentration of ingredients or contaminants used in the base fluid, typically produced water or brine.

In one aspect, the methods and systems of the current application comprises sampling a fluid at e.g., at or near a well site, and analyzing a concentration of an additive (or other ingredient) in the fluid using capillary electrophoresis, also at or near the well site. In another aspect, the methods and systems of the current application comprises sampling a fluid, and analyzing the concentrations of a plurality of different additives in the fluid using capillary electrophoresis.

Although we have a particular need for the methods disclosed herein in oil and gas production, the method can be applied to any reservoir or well, and can also be applied in manufacturing, and the like, wherever the extremely large volumes of fluids prevent preparation of fluids to sufficient accuracy.

The benefits of the methods and systems of the current application include: 1) a single technique for the analysis of different types of ingredients; 2) a single method to analyze all types of chemicals; 3) use of specific components in individual additives to monitor concentration; 4) minimal to no sample preparation; 5) easy to operate; 6) fast turn around, 7) portable equipment is commercially available, and importantly, 8) the methods can be deployed in the field or rig-side to perform on-site analysis.

Additives that can be analyzed through this CE technique contain at least one component soluble in the base solvent, which is usually water. The additives can be used in various fluids, which are not limited to: drilling fluids, spacer, settable composition (including cement and resins), completion fluid, acidification fluids, fracturing fluid, sand control fluids, or any other fluids which need to be pumped in subterranean zones. The method can also be applied to brine, produced water, sea or river water, connate water, and various mix fluids. The method can also be used to determine the concentration of undesirable contaminants in a particular fluid.

Typically, little of no sample preparation is required, although some liquid samples may require dilution. For other samples, solid particles are first solubilized in e.g., acid or alkaline or other conditions. It should therefore be possible to analyze the composition of solids. This is also likely to be required if one additive is encapsulated for downhole release. The particles can first be broken with shearing energy, temperature, or any other trigger.

For some samples, a suspension (containing solids) is filtered, and the concentration of additives remaining in the mix fluid is measured. For example, once cement is mixed with the mix fluid, additives will adsorb on the cement particles. Knowing the initial concentration of the cement, and the concentration of additive remaining in solution after filtration, it will be possible to measure the amount of additive adsorbed on cement particles. In the lab, it may be beneficial to measure kinetics of adsorption, competitive adsorption between additives, etc. (main application in the lab). In the field, this could find application for analysis of mud composition recirculated from the well. The engineer can then add the missing amount of selected additive, based on this analysis (assuming the structure of the additive has not changed with temperature).

The disclosure includes any one or more of the following embodiments, in any combination thereof:

A method, comprising:
obtaining a sample of a well fluid;
injecting the sample into a capillary tube;
inserting the capillary tube into a functional capillary electrophoresis instrument; and
determining a concentration of an ingredient in the sample of the well fluid.
A method as herein described, further comprising comparing said concentration against a target concentration of said ingredient.
A method as herein described, further comprising adjusting the well fluid before using or disposing of the well fluid.
A method as herein described, wherein concentrations of a plurality of ingredients are determined in a single test.
A method as herein described, wherein well fluid is a drilling fluid, a cement slurry, a fracking fluid, a fracking fluid breaker, an enhanced oil recovery fluid, a spacer fluid, -continued a settable composition, a completion fluid, an acidification fluid, a sand control fluid, a
produced water, an injected water, a formation water, a river water, a sea water, a
brine, or a mix-fluid for same.
A method as herein described, wherein the well fluid is a mix-fluid for a cement
slurry.
A method as herein described, wherein the ingredient is one or more of a retarder, a
fluid-loss-control additive, a dispersant, a thixotropic additive, a lime, a salt, an
additive for controlling lost circulation, an accelerator, a surfactant, a mixing aid, a
foaming agent, an anti-foaming agent, an anti-settling agent, an anti-gelling agent, a
gas migration control additive, and a clay stabilizer.
A method as herein described, wherein the ingredient is one or more of a retarder, a
fluid-loss-control additive, and a dispersant.
A method as herein described, wherein the determining is performed at a location
where the well fluid is prepared, used, collected or disposed of.
A method as herein described, wherein the determining is performed at a well site.
A method as herein described, wherein the determining is performed at a location
different from where the well fluid is prepared, used, collected or disposed of, to
which the sample can be delivered in a sufficiently timely manner.
A method as herein described, wherein said capillary tube is an anionic capillary tube,
a cationic capillary tube, a coated capillary tube, a coated anionic capillary tube, a
coated cationic capillary tube, or a microfluidic chip device.
A method as herein described, wherein the well fluid is mixed on the fly.
A method as herein described, wherein the well fluid is batch mixed.
A method as herein described, wherein the sample is obtained at regular intervals
during or after mixing.

By providing any examples herein, it is intended that the specific examples listed not be limiting, but include other all other possible examples as well.

By "capillary electrophoresis" or "CE" what is meant is an analytical technique performed in millimeter and smaller capillaries or fluidic channels that separates ions based on their electrophoretic mobility with the use of an applied voltage. The electrophoretic mobility is dependent upon the charge of the molecule, the viscosity, and the molecular radius. The term includes all of the variations on CE techniques.

By "well site" what is meant is the physical location where a wellbore is drilled to penetrate a subterranean formation, such as at the well-pad or rig or very close thereto. The size of a well site varies depending on the foot print of the production facilities needed. It generally comprises an area that is about ½ acre to 10 acres, but in exceptional cases a well site can be tens to hundreds acres in area.

By "reservoir" what is meant herein is any subterranean zone that either produces a desired commodity, such as oil, gas, water, coal, geothermal energy, minerals, and the like, or is used to store a commodity, such as $CO_2$. Although we have used oil and gas wells as a common example thereof, the disclosure is not intended to be limited thereby.

By "additives" what is meant is any additive added to a fluid for use in an oil-and-gas or other reservoir operation. Hundreds of such additives are known, including retarder, accelerators, surfactants, emulsifiers, dispersants, wetting agents, buffers, fluid loss control agent, anti-corrosion agents, acids, polymers, crosslinkers, viscosifiers, gels, gel breakers, foaming agents, anti-foaming agents, defoamers, biocides, chelating agents, salts, various polymers, anti-settling agent, anti-gelling agent, clay stabilizers, gas migration control additives, and solvents, to name a few.

By "contaminants" what is meant is any substance in a mix-fluid or oilfield or reservoir fluid that is undesirable. A good example is salts or organic solvent present in recycled produced water.

By "ingredient" what is meant is any additive or contaminant or other component of a fluid.

By "well fluid" what is meant is any fluid for use in or at a well or reservoir. In embodiments, a well fluid can be a drilling fluid, a cement slurry, a fracking fluid, a fracking fluid breaker, an enhanced oil recovery fluid, a spacer fluid, a settable composition, a completion fluid, an acidification fluid, a sand control fluid, a produced water, an injected water, a formation water, a river water, a sea water, a brine, or a mix-fluid for same.

By "mix-fluid" what is meant is the water plus additives that are mixed with another agent, such as cement powder or proppant, to make a final fluid for use in a well or reservoir. Where a well fluid does not contain added solids, the mix-fluid is the final fluid.

The following abbreviations are used herein:

| ABBREVIATION | TERM |
| --- | --- |
| CE | Capillary electrophoresis |
| EOF | electroosmotic flow |
| PAAM | Poly-acryl-acrylamide |
| PDMA | poly-dimethyl-acrylamide |
| PEG | poly-ethylene-glycol |
| PEO | poly-ethylene-oxide |
| PI | poly-imides |
| PVA | Poly-vinyl-alcohol |
| PVP | poly-vinyl-pyrrolidone |
| QA | Quality assurance |
| QC | Quality control |

The use of the word "a" or "an" when used in conjunction with the term "comprising" in the claims or the specification means one or more than one, unless the context dictates otherwise.

The term "about" means the stated value plus or minus the margin of error of measurement or plus or minus 10% if no method of measurement is indicated.

Depending on the specifics of a given application, the testing methodology may be employed for testing a variety of fluids. In many applications, the testing methodology may be used to detect and monitor specific ions or groups of ions.

The use of the term "or" in the claims is used to mean "and/or" unless explicitly indicated to refer to alternatives only or if the alternatives are mutually exclusive.

The terms "comprise", "have", "include" and "contain" (and their variants) are open-ended linking verbs and allow the addition of other elements when used in a claim.

The phrase "consisting of" is closed, and excludes all additional elements.

The phrase "consisting essentially of" excludes additional material elements, but allows the inclusions of non-material elements that do not substantially change the nature of the embodiment, such as varying buffers, matrixes, sample dilutions, and the like.

DESCRIPTION OF FIGURES

FIG. 2C also shows a zoom of the mid-section from 3-5 minutes.

DETAILED DESCRIPTION

At the outset, it should be noted that in the development of any such actual embodiment, numerous implementation-specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the methods, devices, and systems used/disclosed herein can also comprise some components other than those cited.

Also, in the summary of the disclosure and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific numbers, it is to be understood that any and all data points within the range are to be considered to have been specified.

Following examples describe applications of the methods and systems of the current application to cement additives. However, people skilled in the art should understand the methods and systems of the current application can also be applied to other well fluids, reservoir fluids, large scale manufacturing fluids, remediation fluids, disposal fluids, and the like, as well as additives, contaminants and other ingredients of such fluids.

Capillary Electrophoresis

Capillary electrophoresis or "CE" is a family of electrokinetic separation methods performed in submillimeter capillaries and in micro- and nano-fluidic channels. There are (at least) six types of capillary electro-separation techniques developed to date, such as but not limited to: capillary zone electrophoresis (CZE), capillary gel electrophoresis (CGE), micellar electrokinetic capillary chromatography (MEKC), capillary electrochromatography (CEC), capillary isoelectric focusing (CIEF), and capillary isotachophoresis (CITP).

Figure 1A:
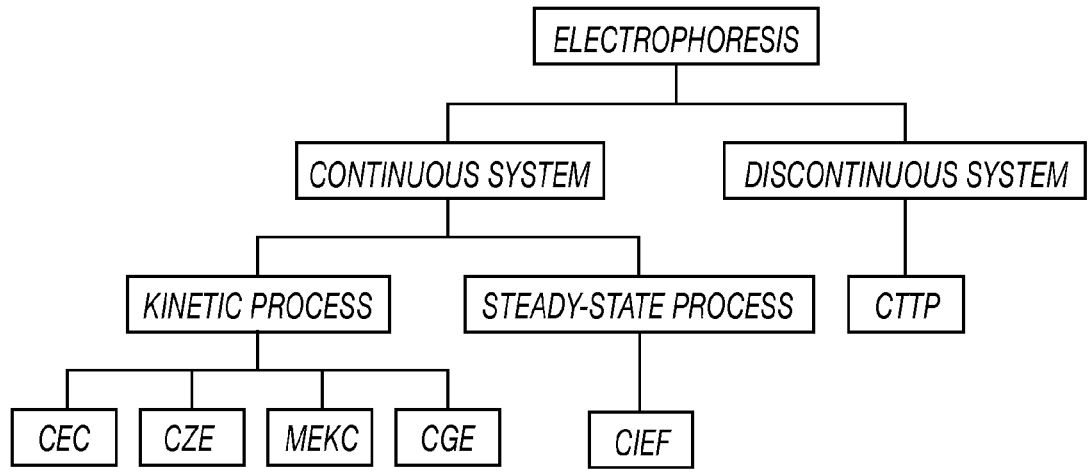
FIG. 1A. Categorization of capillary electrophoresis techniques.

CE techniques can be classified into continuous and discontinuous systems as shown in FIG. 1A. A continuous system has a background electrolyte acting throughout the capillary as a buffer. This can be broken down into kinetic (constant electrolyte composition) and steady-state (varying electrolyte composition) processes. A discontinuous system keeps the sample in distinct zones separated by two different electrolytes.

In CE methods, analytes migrate through electrolyte solutions under the influence of an electric field. Analytes can be separated according to ionic mobility, additionally they may be concentrated by means of gradients in conductivity and/or pH.

The electrophoretic mobility is dependent upon the charge of the molecule, the viscosity, and the atom or molecule's radius. The rate at which the particle moves is directly proportional to the applied electric field—the greater the field strength, the faster the mobility. If two ions are the same size, the one with greater charge will move the fastest. For ions of the same charge, the smaller particle has less friction and overall faster migration rate. Capillary electrophoresis is used because it gives faster results and provides high resolution separation. It is also useful because there is a large range of detection methods available.

Figure 1B:
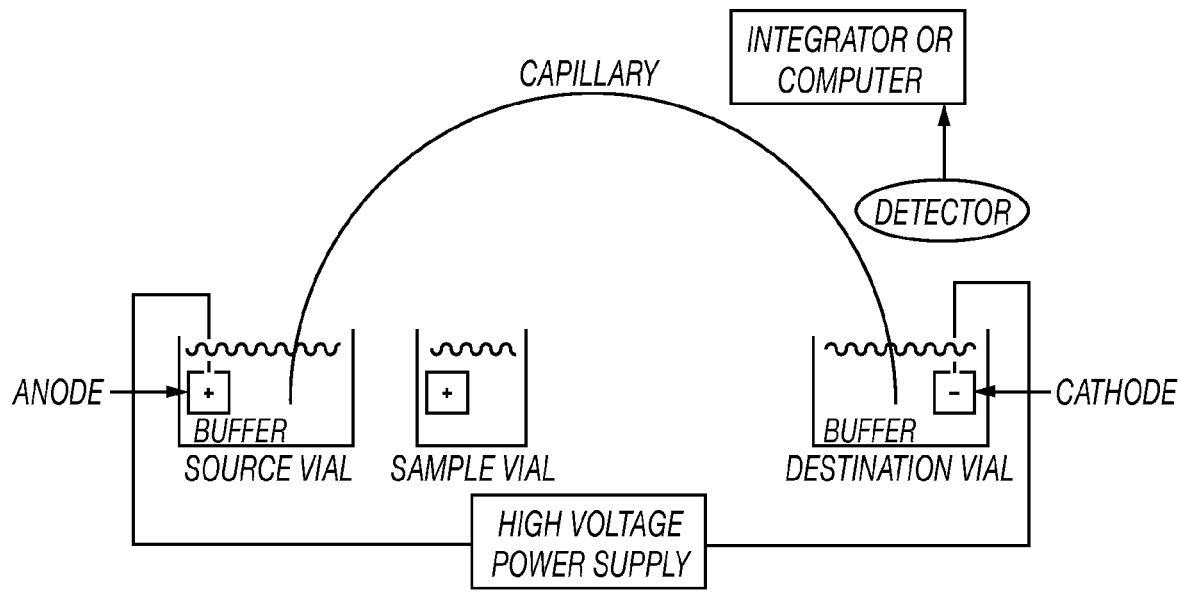
FIG. 1B. Schematic of typical capillary electrophoresis system.

The instrumentation needed to perform capillary electrophoresis is relatively simple. A basic schematic of a capillary electrophoresis system is shown in FIG. 1B. The system's main components are a sample vial, source and destination vials, a capillary, electrodes, a high-voltage power supply, a detector, and a data handling and output device. The source vial, destination vial and capillary are filled with an electrolyte such as an aqueous buffer solution. To introduce the sample, the capillary inlet is placed into a vial containing the sample. Sample is introduced into the capillary via capillary action, pressure, siphoning, or electrokinetically, and the capillary is then returned to the source vial.

The migration of analytes is initiated by an electric field that is applied between the source and destination vials and is supplied to the electrodes by the high-voltage power supply. In the most common mode of CE, ions are pulled through the capillary in the same direction by electroosmotic flow or "EOF". The analytes separate as they migrate due to their different electrophoretic mobility, and are detected near the outlet end of the capillary. The output of the detector is sent to a data output and handling device such as an integrator or computer. The data is then displayed as an electropherogram, which reports detector response as a function of time. Separated chemical compounds appear as peaks with different retention times in an electropherogram, and area under the peak is proportional to concentration.

The simplest way to identify a CE peak is to compare its migration time with that of a known compound. Thus, in the methods disclosure herein, this can be done onsite with appropriate control samples, and/or migration times and standard curves can be determined in advance and compiled for specific uses.

As with other separation techniques, however, the migration time alone may not be always reliable for confirming peak identity and purity. Thus, final confirmation may require additional information. One method of confirmation entails comparing the ratio of absorbance's at different wavelengths in the unknown with that ratio in the suspected compound using spectrophotometric detection. Another method is to compare the ratio of currents obtained from two different electrical potentials using amperometric detection. Other methods are available and can be used as desired or appropriate, such as coupling with mass spectrometers similar to the LC-MS type of coupling.

Exemplary equipment is available from many commercial suppliers, particularly in the biomedical industry. For example, Protein Simple (Toronto, CA), Bio-Rad (Hercules Calif.), Life Technologies (Grand Island, N.Y.), Beckman Coulter (Indianapolis Ind.) all provide commercial capillary electrophoresis instruments. Further, portable systems are in development by many groups, and EH Systems (Simpsonville S.C.) already offers robust portable CE systems. The CEP-5000 and CEP-5100 systems, for example, boast small size, light weight, and low power consumption when used together with their miniaturized detectors. Thus, these are ideal portable CE systems for field use.

CE analyses are usually very fast, use very little sample and reagents, and cost much less than chromatography or conventional electrophoresis. Although modern CE is still in its teenage years, it has demonstrated tremendous potential for a wide range of applications, from small molecules that include inorganic ions, organic acids, drugs, and vitamins to larger molecules, such as proteins, nucleic acids, and even living cells. Based on the tremendous success of this technique in the biomedical sciences, we sought to determine herein if CE would also be suitable for rig-side and other large scale industrial uses and if it would be generally applicable to some of the harsher chemicals used in manufacturing or oil & gas reservoirs during drilling, primary production, secondary recovery and the like.

The capillary column is a key element of the CE separation. Fused silica is by far the most frequently used material, although columns have been made of Teflon and borosilicate glass. The widespread use of fused silica is due to its intrinsic properties, which include transparency over a wide range of the electromagnetic spectrum and a high thermal conductance. Fused silica is also easy to manufacture into capillaries with diameters of a few micrometers. Many reports describe the covalent attachment of silanes with neutral or hydrophilic substituents to the inner wall of the capillary in order to reduce electroosmotic flow and prevent adsorption of the analyte; coatings also tend to stabilize the pH. Microfluidic chip channels are also used in some applications, as are chiral capillaries, isomer separation capillaries, etc.

A wide variety of coatings are available to influence the performance of the capillary tubing. Examples of coatings range from poly-acrylamides (PAAM), poly-ethylene-glycol (PEG), poly-imides, poly-dimethyl-acrylamide, poly-vinyl-alcohol (PVA), poly-vinyl-pyrrolidone (PVP), poly-ethylene-oxide (PEO), and the like.

Cement Slurry Mix-Water

Although retarder concentration in cement slurries is critical, there is currently no satisfactory method for checking that the concentration of retarder is correct. WO2011064632 teaches one such method, but requires the use of a tracer mixed with the additive, such that tracer levels can be detected as a proxy for additive levels. However, the tracer can impact the chemistry of the ingredients and further, one must still have added the correct amount of tracer to the additive, and this introduces another point of variability from batch-to-batch of additive.

We sought therefore, to determine if CE was suitable for confirming the concentration of ingredients, such as retarder, dispersants, anti-foamers, and fluid loss additives in a cement slurry. Table 1 shows various additional oilwell cement additives that can be tested with the methods therein.

TABLE 1

Non-limiting examples of oilwell cement additives.

| Type of Additive | Use | Chemical Composition | Benefit | Type of Cement |
|---|---|---|---|---|
| Accelerators | Reducing WOC time | Calcium chloride | Accelerated setting | All API classes |
|  | Setting surface pipe | Sodium chloride | High early strength | Pozzolans |
|  | Setting cement plugs | Gypsum |  | Diacel systems |
|  | Combating lost circulation | Sodium silicate |  |  |
|  |  | Dispersants |  |  |
|  |  | Seawater |  |  |
| Retarders | Increasing thickening time for placement | Lignosulfonates | Increased pumping time | API Classes D, E, G, and H |
|  | Reducing slurry viscosity | Organic acids | Better flow properties | Pozzolans |
|  |  | CMHEC |  | Diacel systems |
|  |  | Modified lignosulfonates |  |  |
| Weight-reducing additives | Reducing weight | Bentonite/attapulgite | Lighter weight | All API classes |
|  | Combating lost circulation | Gilsonite | Economy | Pozzolans |
|  |  | Diatomaceous earth | Better fill-up | Diacel systems |
|  |  | Perlite | Lower density |  |
|  |  | Pozzolans |  |  |
|  |  | Microspheres (glass spheres) |  |  |
|  |  | Nitrogen (foam cement) |  |  |

TABLE 1-continued

Non-limiting examples of oilwell cement additives.

| Type of Additive | Use | Chemical Composition | Benefit | Type of Cement |
|---|---|---|---|---|
| Heavyweight additives | Combating high pressure<br>Increasing slurry weight | Hematite<br>Limenite<br>Barite<br>Sand<br>Dispersants | Higher density | API Classes D, E, G, and H |
| Additives for controlling lost circulation | Bridging<br>Increasing fill-up<br>Combating lost circulation<br>Fast-setting systems | Gilsonite<br>Walnut hulls<br>Cellophane flakes<br>Gypsum cement<br>Bentonite/diesel oil<br>Nylon fibers<br>Thixotropic additives | Bridged fractures<br>Lighter fluid columns<br>Squeezed fractured zones<br>Treating lost circulation | All API classes<br>Pozzolans<br>Diacel systems |
| Filtration-control additives | Squeeze cementing<br>Setting long liners<br>Cementing in water-sensitive formations | Polymers<br>Dispersants<br>CMHEC<br>Latex | Reduced dehydration<br>Lower volume of cement<br>Better fill-up | All API classes<br>Pozzolans<br>Diacel systems |
| Dispersants | Reducing hydraulic horsepower<br>Densifying cement slurries for plugging<br>Improving flow properties | Organic acids<br>Polymers<br>Sodium chloride<br>Lignosulfonates | Thinner slurries<br>Decreased fluid loss<br>Better mud removal<br>Better placement | All API classes<br>Pozzolans<br>Diacel systems |
| Special cements or additives | | | | |
| Salt | Primary cementing | Sodium chloride | Better bonding to salt, shales, sands | All API classes |
| Silica flour | High-temperature cementing | Silicon dioxide | Stabilized strength | All API classes |
| Radioactive tracers | Tracing flow patterns<br>Locating leaks | $_{63}I^{131}$, $_{77}Ir^{192}$ | | All API classes |
| Pozzolan lime | High-temperature cementing | Silica-lime reactions | Lighter weight<br>Economy | |
| Silica lime | High-temperature cementing | Silica-lime reactions | Lighter weight | |
| Gypsum cement | Dealing with special conditions | Calcium sulfate Hemihydrate | Higher strength<br>Faster setting | |
| Latex cement | Dealing with special conditions | Liquid or powdered latex | Better bonding<br>Controlled filtration | API Classes A, B, G, and H |
| Thixotropic additives | Covering lost-circulation zones<br>Preventing gas migration | Organic additives<br>Inorganic additives | Fast setting and/or gelation<br>Less fallback<br>Reduces lost circulation | All API Classes |

In step 1 of the method, the capillary was coated with anion coating and pre-conditioned with the separation buffer. In step 2, a sample of mix-fluid for use to make a cement slurry (by adding cement powder) with one or more additives was injected in to the column, followed by separation by applying voltage in step 3. The method can be performed in presence of cement as well. After the separation and detection, in step 4, the capillary was rinsed with the condition and rinse solution. Detection was by measuring UV absorbance at a suitable wavelength using a spectrometer.

This is a simple representation of the method, but persons of skill in the art can add or remove steps based on the additives and well fluid they are interested in.

Protocols

Several experiments were conducted with one or more additives mixed in brine, as a typical fluid used in reservoirs. However, the dilution can be done with deionized water, tap water, brine, produced water or any other desired solvent or solution as long as the components do not affect the procedure.

First, we estimated or determined the viscosity of the additive fluid, and diluted if needed. For example during retarder analysis, retarder was diluted 1000 times. If the additive was solid, then we dissolved the solid sample at reasonable concentration to enable the injection of the accurate sample volume into the system. If necessary, solids can be comminuted to powders or otherwise solubilized and/or the sample can be filtered before proceeding.

In the case of mixed fluids, individual additives were prepared as above, and mixed in desired ratio before proceeding.

Once the sample was ready, it was analyzed with the desired method. However, the capillary was first conditioned according to the method illustrated in Table 2, where conditioning and rinse solutions were 0.1 M NaOH. A commercially available anion coating was applied (anion coating provided with CElixirOA™ kit, MicroSolv, Eatontown, N.J.) for 50 sec. duration at 20 psi pressure. Depending on the chemistry of the additive, any appropriate anion or cation coating can be used for the desired duration and at desired pressure.

TABLE 2

Exemplary method for capillary conditioning.

| Step | | Pressure (psi) | Voltage (kV) | Duration | Inlet vial position | Outlet vial position |
|---|---|---|---|---|---|---|
| Step 1 | Rinse - Conditioner | 20.0 | | 1.00 min | AI1 | AO1 |
| Step 2 | Rinse - Rinse Solution | 20.0 | | 1.00 min | BI1 | BO1 |
| Step 3 | Rinse - Anion Coating | 20.0 | | 0.50 min | CI1 | AO1 |
| Step 4 | Rinse - Anion Separation Buffer | 20.0 | | 0.50 min | DI1 | AO1 |
| Step 5 | Separation | 0.0 | −30.0 | 10.0 min | EI1 | EO1 |
| Step 6 | Stop Data | | | | | |
| Step 7 | Rinse - Conditioner | 20.0 | | 0.50 min | AI1 | AO1 |
| Step 8 | Rinse - Rinse Solution | 20.0 | | 0.5 min | BI1 | BO1 |
| Step 9 | End | | | | | |

The actual samples were analyzed per Table 3.

TABLE 3

Exemplary method for anionic retarder analysis.

| Step | | Pressure (psi) | Voltage (kV) | Duration | Inlet vial position | Outlet vial position |
|---|---|---|---|---|---|---|
| Step 1 | Rinse - Anion Coating | 20.0 | | 0.50 min | CI1 | AO1 |
| Step 2 | Rinse - Anion Separation Buffer | 20.0 | | 0.50 min | DI1 | AO1 |
| Step 3 | Inject - Sample | 0.5 | | 8.0 sec | FI1 | AO1 |
| Step 4 | Inject - Water | 0.1 | | 10.0 min | GI1 | AO1 |
| Step 5 | Separation | 0.0 | −30.0 | 8.0 min | EI1 | EO1 |
| Step 6 | Stop Data | | | | | |
| Step 7 | Rinse - Conditioner | 20.0 | | 0.50 min | AI1 | AO1 |
| Step 8 | Rinse - Rinse Solution | 20.0 | | 0.5 min | BI1 | BO1 |
| Step 9 | End | | | | | |

Small negatively charged molecules such as ions and aliphatic organic acids are not UV absorbing and therefore require an "indirect" method of detection when using UV detectors. The CElixirOA™ pH 5.4 and pH 8.2 buffers are phosphoric acid buffers that contain a "chromophore" that will completely absorbs all the UV energy and produces a detector response that is full and "off scale". When a non-absorbing analyte, such as an organic acid, an added ion or a surfactant, passes the detection window, the detector senses a decrease in absorption and records the negative "peak". One benefit of this system is that all non-UV absorbing additives can be detected at the same wavelength. The system is optimized for use at 233 nm but it will also work with a UV filter at 254 nm and with a filter of 230 nm.

Some anions such as nitrate, nitrate and bromide as well as aromatic acids and unsaturated aliphatic acids are UV absorbing. They separate best in very acidic conditions such as pH 2.5 and for this reason CElixirOA™ pH 2.5 is available without chromophores and operates in the same way cathodic buffer systems do with regard to detection.

Due to the negative charge of the anions, they migrate toward the anode (positive). To have these anions flow in the direction toward the detection window of an integrated instrument, the polarity of the CE instrument is reversed. All other conditions remain "normal" when using these CElixirOA™ kits and no other changes are required. Vials are loaded in the same position as before.

Once the sample applied to the column, and chased with a water plug to improve sensitivity, desired voltage was applied across the capillary to perform a separation step with an anion separation buffer. For example, in the cement retarder analysis −30 kV voltage for 10 mm duration with an anionic separation buffer with pH 5.4 was used. In this step, the capillary was dipped in anion separation buffer on both ends. However, based on the chemistry of the additives, one can use an anionic separation buffer with higher or lower pH ranges. Also, we can use cationic separation buffer if the additives are cationic in nature for the desired duration and desired pressure.

Serial dilutions of each additive were assayed to create a calibration curve, which was then plotted. Using the curve, an unknown amount of additive can be determined based on the slope.

Exemplary Additives

The test methods developed herein were tested with different types of cement additives:

| ADDITIVE TYPE | UV absorbance |
|---|---|
| Retarder 1 | 254 |
| Retarder 2 | 254 |
| Retarder 3 | 254 |
| Multifunctional additive | 254 |
| Dispersant | 254 |
| Retarder 1 | 254 |

Figure 2A:
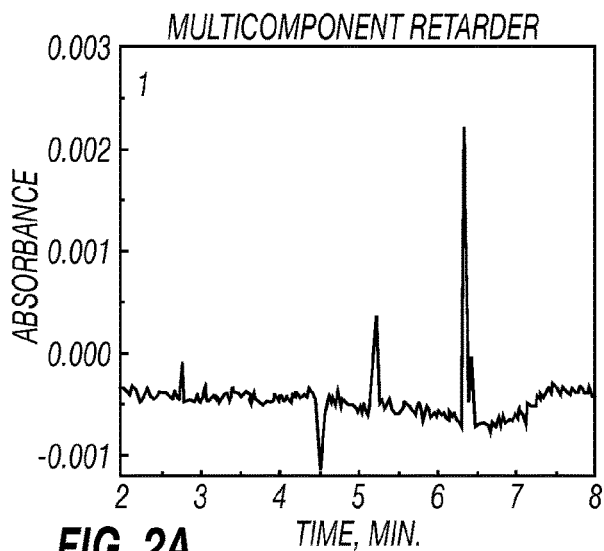
FIG. 2A. CE analysis of cement retarders
Figure 2B:
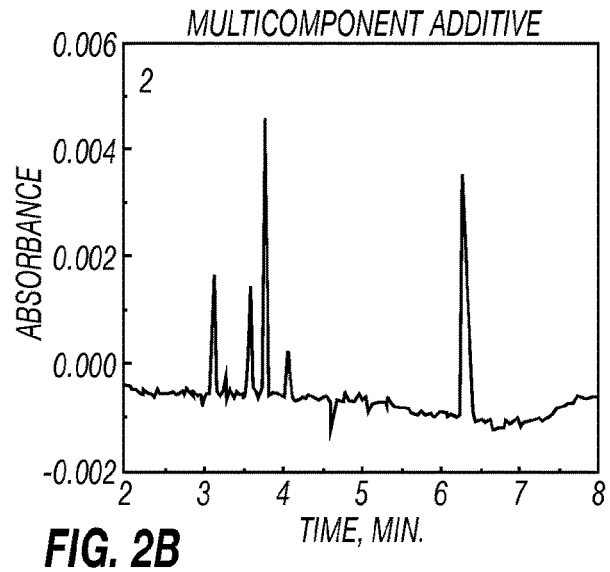
FIG. 2B. CE analysis of cement additive.
Figure 2C:
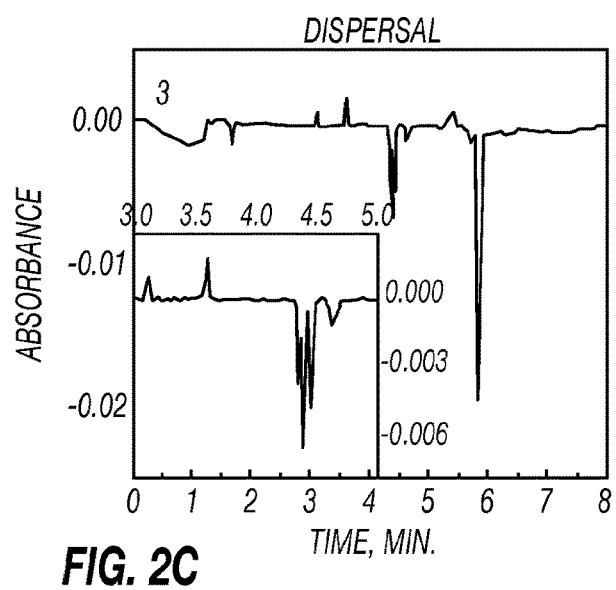
FIG. 2C. CE analysis of cement dispersant.

As can be seen from the data presented in FIG. 2, the individual additives consist of a range of different chemicals with different retention time and response. Depending on the analyte, individual components may have either negative or positive response without affecting the quantitative response. As part of the CE buffer design the UV chromophore can also be optimized to enhance response factors.

The test method described above requires less than 10 mm, but this can be further reduced by changing the parameters of the CE, for example, increasing voltage or flow rate, varying capillary length, buffer, pH etc. Separation can be improved by changing the size and type of the capillary, and inducing gradients of voltage during the analysis.

It should be noted that all the data present in FIG. 2 was obtained with the same CE-protocol. This highlights that different cement additives (single-component or multi-component additives) can be detected accurately with a single methodology. Furthermore, for each of the additives, the retention time was different. It is therefore possible to determine the concentration of each ingredient in the mix-fluid.

Figure 3A:
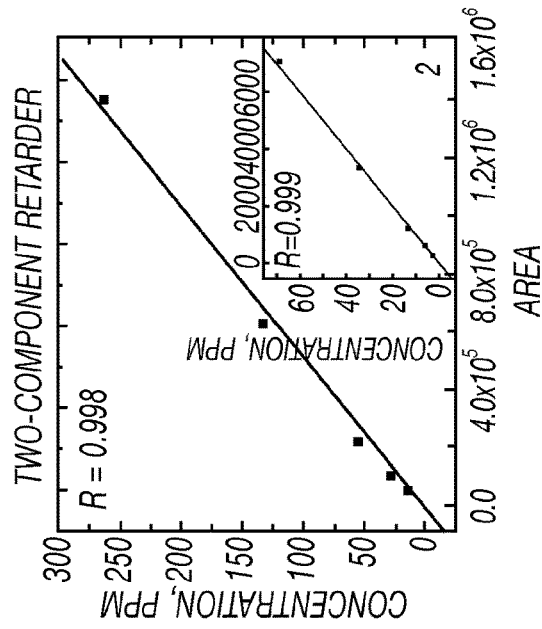
FIG. 3A. Calibration curve for Retarder.
Figure 3B:
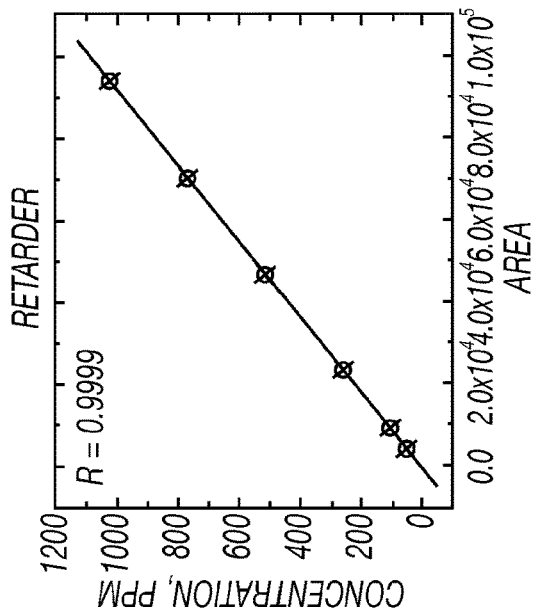
FIG. 3B. Calibration curve for a major and minor constituent (inset) of a multi-functional additive.

Our experiments also showed the CE results to be quantitatively accurate. When the calibration of one constituent in a few selected additives was performed, excellent quantitative correlation was observed. FIG. 3A-B presents the calibration curves for two different proprietary additives.

Figure 4A:
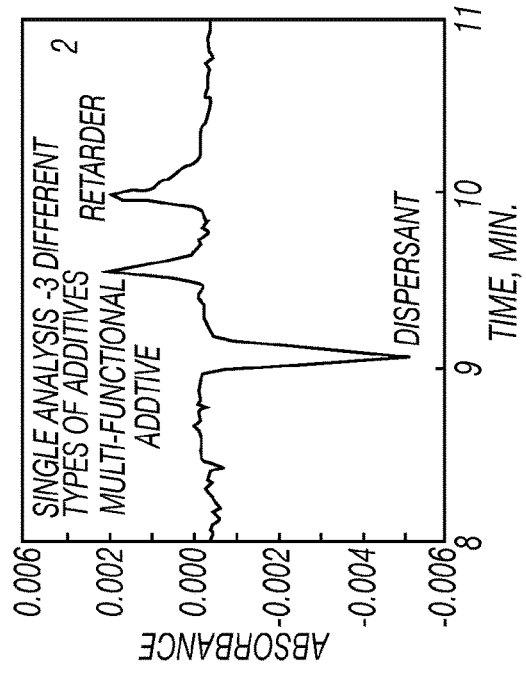
FIG. 4A. Mix-fluid analysis of multiple additives. Fluids are prepared by mixing individual additives in 1:1:1 volume ratio, wherein 3 retarders injected together into the capillary, and quantitatively separated and quantitated.
Figure 4B:
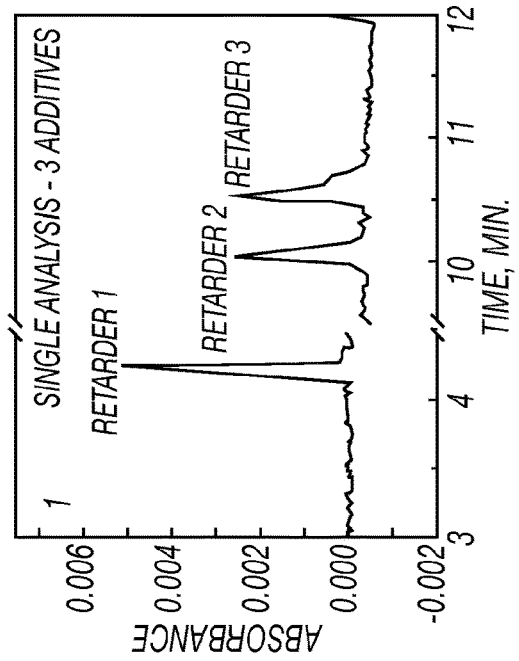
FIG. 4B. Mix-fluid analysis: fluids are prepared by mixing individual additives in 1:1:1 volume ratio, wherein 3 different types of additives viz., a retarder, a dispersant and a multi-functional additive injected together and separated quantitatively.

Moreover, the methods and systems of the current application can analyze either individual additives as well as mix-fluids with one type or more types (functionalities) of additives. FIG. 4A-B presents the different types of mix-fluid analysis, wherein FIG. 4A shows the separation of a mixture of three proprietary retarders, while FIG. 4B shows the separation of three different types of additives—dispersant, a retarder, and a multifunctional additive—in a single mix-fluid.

These experiments highlight the advantages and applicability of CE for rig-side or lab analysis of different types of additives in fluids. Although examples shown here consider only cement-based additives, it is the first demonstration where a single technique is employed to analyze all the constituents of additives and mix-fluids at the rig or lab. Further, with judicious selection of capillary type, coating, buffer, pH, and running conditions, a wide variety of additives can be successfully measured this way.

In addition, since the analysis can be performed on the rig, it improves the QA/QC of the fluid design. It also avoids aging of the mix-fluids, whose composition can easily vary before its analysis back in a remote laboratory. The examples also show that the method is accurate (calibration curves).

Also the methods and systems of the current application can be used to retro-control the pumps injecting the additives in the mix-fluids based on resultant mix-fluid composition and field requirements. For example, the rig mix-fluid composition is compared to the designed mix-fluid composition. If the concentration of one or several additives are lower than expected, the pump can be activated automatically or manually to add the needed amount of additive. If the concentration(s) of one or several additives are higher than expected, more carrier fluid (usually water) can be added, as well as the other additives in order to meet the required composition.

The preceding description has been presented with reference to some embodiments. Persons skilled in the art and technology to which this disclosure pertains will appreciate that alterations and changes in the described structures and methods of operation can be practiced without meaningfully departing from the principle, and scope of this application. Accordingly, the foregoing description should not be read as pertaining only to the precise structures described and shown in the accompanying drawings, but rather should be read as consistent with and as support for the following claims, which are to have their fullest and fairest scope.

The references made herein merely provide information related to the present disclosure and may not constitute prior art. The following references are hereby incorporated by reference herein in their entireties for all purposes:

Non-Aqueous Capillary Electrophoresis 2005-2008, Geiser, L.; Veuthey, J-L Electrophoresis, 2009 30 36-49.

Improved Analysis Techniques Quantitatively Determine Critical Organic Additives Simultaneously In Cement Blends, Cob, A; SPE 86-37-48, 1986 95-100

Well Cementing, 2nd Edition, E. Nelson, D. Guillot, 2006

WO2014014587 Capillary electrophoresis for reservoir fluid analysis at wellsite and laboratory

What is claimed is:

1. A method, comprising:
    obtaining a sample of a well fluid before or during injection of the well fluid into a wellbore;
    injecting the sample without a tracer into a capillary tube;
    inserting the capillary tube into a capillary electrophoresis system; and
    determining a concentration of an ingredient in the sample of the well fluid with the capillary electrophoresis system.

2. The method of claim 1, further comprising:
    comparing the concentration against a target concentration of the ingredient.

3. The method of claim 1, further comprising:
    adjusting the well fluid before or during injection of the well fluid into the wellbore based on the concentration of the ingredient in the sample of the well fluid.

4. The method of claim 1, further comprising:
    determining respective concentrations of a plurality of additional ingredients in the sample of the well fluid with the capillary electrophoresis system, wherein the concentration of the ingredient and the respective concentrations of the plurality of additional ingredients are determined in a single test.

5. The method of claim 1, wherein the well fluid is a drilling fluid, a cement slurry, a fracking fluid, a fracking fluid breaker, an enhanced oil recovery fluid, a spacer fluid, a settable composition, a completion fluid, an acidification fluid, a sand control fluid, a produced water, an injected water, a formation water, a river water, a sea water, a brine, or a mix-fluid for same.

6. The method of claim 5, wherein the well fluid is a mix-fluid for a cement slurry.

7. The method of claim 6, further comprising:
    mixing the ingredient with a carrier fluid to form the mix-fluid for the cement slurry;
    adding the cement powder after obtaining the sample of the mix-fluid for the cement slurry to form the cement slurry; and
    injecting the cement slurry into the wellbore.

8. The method of claim 6, wherein the ingredient is one or more of a retarder, a fluid-loss-control additive, and a dispersant.

9. The method of claim 1, wherein the ingredient is one or more of a retarder, a fluid-loss-control additive, a dispersant, a thixotropic additive, a lime, a salt, an additive for controlling lost circulation, an accelerator, a surfactant, a mixing aid, a foaming agent, an anti-foaming agent, an anti-settling agent, an anti-gelling agent, a gas migration control additive, and a clay stabilizer.

10. The method of claim 9, wherein the ingredient is one or more of a retarder, a fluid-loss-control additive, and a dispersant.

11. The method of claim 1, wherein the determining is performed at a location where the well fluid is prepared, used, or collected.

12. The method of claim 11, wherein the determining is performed at a well site.

13. The method of claim 1, wherein the determining is performed at a location different from where the well fluid is prepared, used, or collected.

14. The method of claim 1, wherein the capillary tube is an anionic capillary tube, a cationic capillary tube, a coated capillary tube, a coated anionic capillary tube, or a coated cationic capillary tube.

15. The method of claim 1, wherein the well fluid is mixed on the fly.

16. The method of claim 1, wherein the well fluid is batch mixed.

17. The method of claim 1, comprising obtaining the sample and a plurality of additional samples at regular intervals during or after mixing to form the well fluid.

18. The method of claim 1, further comprising:
mixing the ingredient with a carrier fluid on a rig at a well site to form the well fluid;
carrying out the obtaining, the injecting, the inserting, and the determining on the rig at well site; and
injecting the well fluid from the rig at the well site into the wellbore.

19. The method of claim 2, further comprising:
adjusting the well fluid before or during injection of the well fluid into the wellbore such that the concentration corresponds to the target concentration.

20. The method of claim 19, wherein adjusting the well fluid comprises controlling a pump to add more of the ingredient to the well fluid before or during injection of the well fluid into the wellbore.

* * * * *